US008739605B2

(12) United States Patent
McLain et al.

(10) Patent No.: US 8,739,605 B2
(45) Date of Patent: Jun. 3, 2014

(54) SYSTEM AND METHOD FOR DIAGNOSING FAULTS IN VACUUM PUMPS OF FUEL SYSTEMS AND FOR DIAGNOSING LEAKS IN FUEL SYSTEMS

(75) Inventors: Kurt D. McLain, Clarkston, MI (US); William R. Cadman, Fenton, MI (US)

(73) Assignee: GM Global Technology Operations LLC

( * ) Notice: Subject to any disclaimer, the term of this patent is extended or adjusted under 35 U.S.C. 154(b) by 637 days.

(21) Appl. No.: 12/952,522

(22) Filed: Nov. 23, 2010

(65) Prior Publication Data

US 2012/0097252 A1 Apr. 26, 2012

Related U.S. Application Data

(60) Provisional application No. 61/405,456, filed on Oct. 21, 2010.

(51) Int. Cl.
*G01M 3/04* (2006.01)

(52) U.S. Cl.
USPC .......... 73/37

(58) Field of Classification Search
USPC .......... 73/49.2
See application file for complete search history.

(56) References Cited

U.S. PATENT DOCUMENTS

| | | | | | |
|---|---|---|---|---|---|
| 5,750,888 | A * | 5/1998 | Matsumoto et al. | ........ | 73/114.39 |
| 6,016,690 | A * | 1/2000 | Cook et al. | ........ | 73/49.2 |
| 6,164,123 | A * | 12/2000 | Corkill | ........ | 73/49.7 |
| 6,311,548 | B1 * | 11/2001 | Breidenbach et al. | ........ | 73/40 |
| 7,383,826 | B2 * | 6/2008 | Kano et al. | ........ | 123/518 |
| 7,438,060 | B2 * | 10/2008 | McLain | ........ | 123/519 |
| 2007/0089721 | A1 * | 4/2007 | Amano et al. | ........ | 123/698 |
| 2008/0135025 | A1 * | 6/2008 | McLain | ........ | 123/520 |
| 2009/0266147 | A1 * | 10/2009 | Maegawa | ........ | 73/40.7 |
| 2009/0299561 | A1 * | 12/2009 | Matsumoto | ........ | 701/22 |

* cited by examiner

*Primary Examiner* — Hezron E Williams
*Assistant Examiner* — Mark A Shabman

(57) ABSTRACT

A control system includes a switching valve control module, a pressure determination module, and a fuel system diagnostic module. The switching valve control module actuates a switching valve in a fuel system of a vehicle between a first position and a second position, the first position venting a suction side of a vacuum pump in the fuel system to an atmosphere, the second position sealing the suction side of the vacuum pump from the atmosphere. The pressure determination module determines a first pressure on the suction side of the vacuum pump when the switching valve is in the first position, and determines a second pressure on the suction side of the vacuum pump when the switching valve is in the second position. The fuel system diagnostic module selectively diagnoses a fault in the vacuum pump based on the first pressure and the second pressure.

20 Claims, 3 Drawing Sheets

SYSTEM AND METHOD FOR DIAGNOSING FAULTS IN VACUUM PUMPS OF FUEL SYSTEMS AND FOR DIAGNOSING LEAKS IN FUEL SYSTEMS

CROSS-REFERENCE TO RELATED APPLICATIONS

This application claims the benefit of U.S. Provisional Application No. 61/405,456, filed on Oct. 21, 2010. The disclosure of the above application is incorporated herein by reference in its entirety.

FIELD

The present disclosure relates to diagnosing faults in vacuum pumps of fuel systems and to diagnosing leaks in fuel systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust a mixture of air and fuel to generate torque. The fuel of the air/fuel mixture may be a combination of liquid fuel and vapor fuel. A fuel system is used to supply liquid fuel and vapor fuel to the engine. A fuel injector provides the engine with liquid fuel drawn from a fuel tank. The fuel system may include an evaporative emissions (EVAP) system that provides the engine with fuel vapor drawn from a canister.

Generally, liquid fuel is contained within the fuel tank. In some circumstances, the liquid fuel may vaporize and form fuel vapor. The canister stores the fuel vapor. The EVAP system includes a purge valve and a vent valve. Operation of the engine causes a vacuum (low pressure relative to atmospheric pressure) to form within an intake manifold of the engine. The vacuum within the intake manifold and actuation of the purge and vent valves allows the fuel vapor to be drawn into the intake manifold, thereby purging the fuel vapor from the canister to the intake manifold.

SUMMARY

A control system includes a switching valve control module, a pressure determination module, and a fuel system diagnostic module. The switching valve control module actuates a switching valve in a fuel system of a vehicle between a first position and a second position, the first position venting a suction side of a vacuum pump in the fuel system to an atmosphere, the second position sealing the suction side of the vacuum pump from the atmosphere. The pressure determination module determines a first pressure on the suction side of the vacuum pump when the switching valve is in the first position, and determines a second pressure on the suction side of the vacuum pump when the switching valve is in the second position. The fuel system diagnostic module selectively diagnoses a fault in the vacuum pump based on the first pressure and the second pressure.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
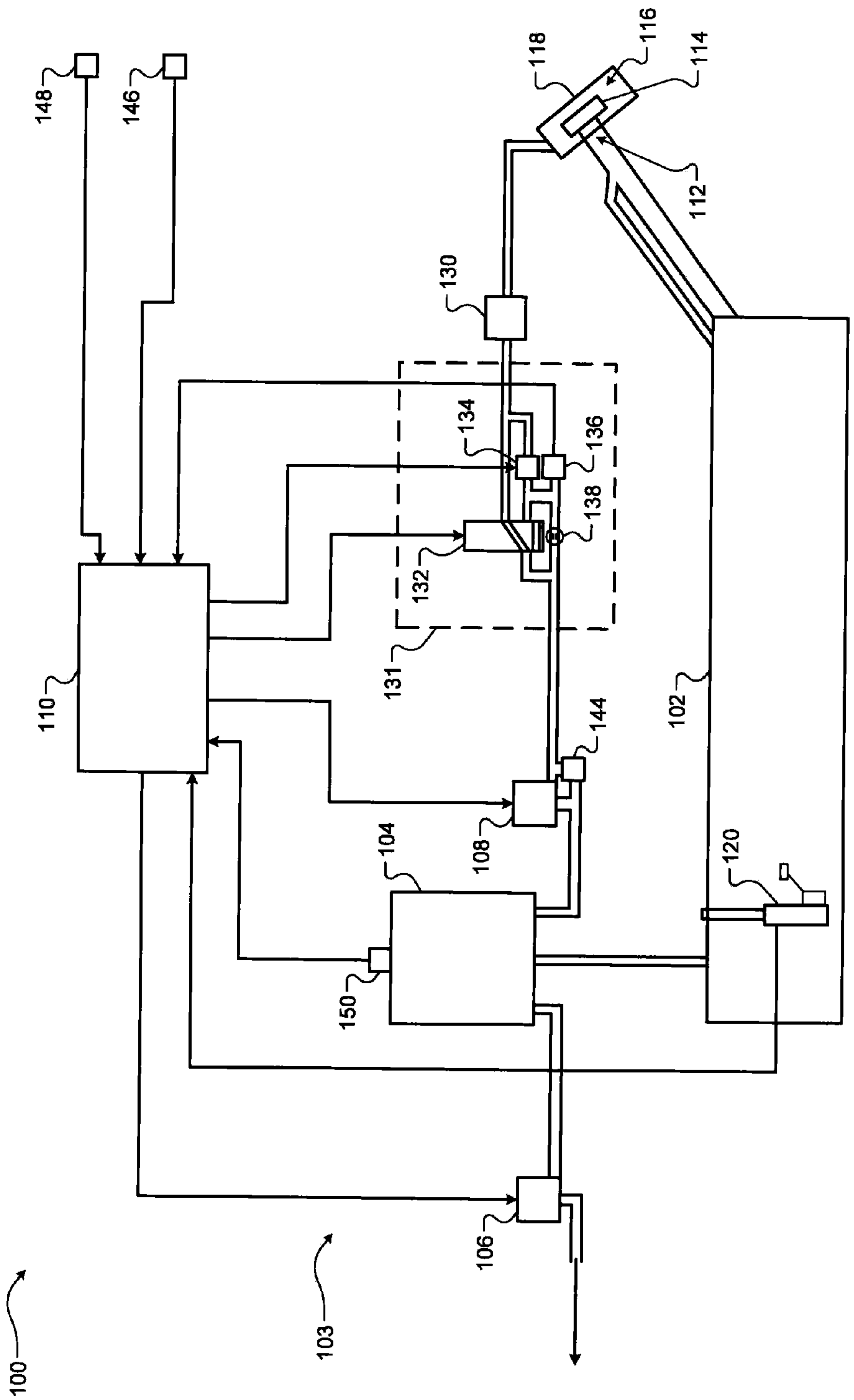
FIG. 1 is a functional block diagram of a fuel system according to the principles of the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A fuel system typically includes an evaporative emissions (EVAP) system and an EVAP leak check (ELC) system that checks for leaks in the EVAP system. The ELC system includes a switching valve, a vacuum pump, a reference orifice, and a pressure sensor on a suction side of the vacuum pump. The pressure sensor detects a first pressure when the vacuum pump is commanded off and the switching valve is in a vent position. The first pressure represents barometric (i.e., atmospheric) pressure when the vacuum pump is off as commanded. The vacuum pump is then switched on, valves in the fuel system are adjusted, the pressure sensor detects other pressures, and leaks in the EVAP system are identified based on the first pressure and the other pressures.

Leak checks are typically performed hours after a vehicle is shutdown. When a vehicle is shutdown, a control module for the fuel system is normally in a sleep mode in which the control module has no external communication and operates on low power. Before a leak check, the control module switches to a wake mode in which the control module has external communication and operates on full power.

Occasionally, the vacuum pump may become stuck on due to, for example, faulty wiring or a fault in the control module. If the vacuum pump becomes stuck on before or when the control module wakes up (i.e., switches to the wake mode), then the vacuum pump will create a vacuum in the EVAP system and the first pressure may not represent the barometric pressure. Since leaks are identified on the basis that the first pressure represents the barometric pressure, leaks may be falsely identified and/or may not be identified when the vacuum pump is stuck on.

Some ELC control systems detect the first pressure when the control module initially wakes up, and then detect a second pressure under the same conditions when a predetermined period has elapsed. If the vacuum pump becomes stuck on when the control module wakes up, the vacuum pump creates a vacuum in the EVAP system and the second pressure is less than the first pressure. In this case, the pressure difference may be used to identify whether the vacuum pump is stuck on. If the vacuum pump is stuck on before the control module wakes up, the second pressure is equal to the first pressure. In this case, a stuck-on fault in the vacuum pump may not be identified.

An ELC control system and method according to the principles of the present disclosure uses the switching valve to identify when the vacuum pump is stuck on regardless of whether the vacuum pump becomes stuck on before or when the control module wakes up. A first pressure is detected when the vacuum pump is commanded off and the switching valve is in the vent position. A second pressure is detected when a predetermined period has elapsed, the vacuum pump is commanded off, and the switching valve is in a pump position.

The first pressure and the second pressure are both equal to barometric pressure when the vacuum pump is off. In a sealed fuel system, the second pressure is less than the first pressure when the vacuum pump is stuck on regardless of whether the vacuum pump switches on before or when the control module wakes up. This difference exists in either case because the vacuum pump creates a stronger vacuum when the switching valve is in the pump position relative to when the switching valve is in the vent position. Thus, a stuck-on fault in the vacuum pump is identified when a difference between the first pressure and the second pressure is greater than a threshold.

In this manner, an ELC control system and method of the present disclosure identifies when the vacuum pump is stuck on before a leak check is performed. In addition, checks for leaks in the EVAP system are aborted when the vacuum pump is stuck on. In turn, a false identification of leaks in the EVAP system and a failure to identify leaks in the EVAP system are avoided.

Although described in the context of a sealed fuel system, it should be understood that an ELC control system and method according to the principles of the present disclosure may also be applied to a non-sealed fuel system. In a sealed fuel system, the vent valve is normally closed but may be opened when purging fuel to the engine, performing fuel system diagnostics, and/or refueling. In a non-sealed fuel system, the vent valve is normally open but may be closed for fuel system diagnostics.

Also, in a non-sealed fuel system, actuating the switching valve from the vent position to the pump position when the vacuum pump is on creates a weaker vacuum. Thus, a stuck-on fault in the vacuum pump may be identified when a difference between the first pressure and the second pressure is less than a threshold. Alternatively, in either a sealed fuel system or in a non-sealed fuel system, a stuck-on fault in the vacuum pump may be identified when an absolute difference between the first pressure and the second pressure is greater than a threshold.

Referring now to FIG. 1, a functional block diagram of a fuel system 100 is presented. The fuel system 100 supplies fuel to an internal combustion engine (not shown) in a vehicle. For example only, the engine may be a gasoline engine, a diesel engine, and/or another suitable type of engine. The engine combusts a mixture of air and fuel within one or more cylinders of the engine to generate drive torque.

In some vehicles, torque generated by the engine may be used to propel the vehicle. In such vehicles, torque output by the engine may be transferred to a transmission (not shown), and the transmission may transfer torque to one or more wheels of the vehicle.

In other vehicles, such as parallel-hybrid vehicles, torque output by the engine may not be transferred to the transmission. Instead, torque output by the engine may be converted into electrical energy by, for example, a motor-generator or a belt alternator starter (BAS). The electrical energy may be provided to the motor-generator, to another motor-generator, to an electric motor, and/or to an energy storage device. The electrical energy may be used to generate torque to propel the vehicle. Some hybrid vehicles may also receive electrical energy from an alternating current (AC) power source, such as a standard wall outlet. Such hybrid vehicles may be referred to as plug-in hybrid vehicles.

The fuel system 100 supplies fuel to an engine, such as an engine in a plug-in hybrid vehicle. More specifically, the fuel system 100 supplies liquid fuel and fuel vapor to the engine. While the fuel system 100 may be discussed as it relates to a plug-in hybrid vehicle, the present disclosure is also applicable to other types of vehicles having an internal combustion engine.

The fuel system 100 includes a fuel tank 102 that contains liquid fuel. Liquid fuel is drawn from the fuel tank 102 by one or more fuel pumps (not shown) and is supplied to the engine. Some conditions, such as heat, vibration, and radiation, may cause liquid fuel within the fuel tank 102 to vaporize.

The fuel system 100 includes an evaporative emissions (EVAP) system 103 that returns vaporized fuel to the fuel tank 102. The EVAP system 103 includes a canister 104, a purge valve 106, and a vent valve 108. The canister 104 traps and stores vaporized fuel (i.e., fuel vapor). For example only, the canister 104 may include one or more substances that store fuel vapor, such as charcoal.

Operation of the engine creates a vacuum within an intake manifold (not shown) of the engine. The purge valve 106 and the vent valve 108 are actuated (e.g., opened and closed) to draw fuel vapor from the canister 104 to the intake manifold for combustion. More specifically, actuation of the purge valve 106 and the vent valve 108 may be coordinated to purge fuel vapor from the canister 104. A control module 110, such as an engine control module, controls the actuation of the purge valve 106 and the vent valve 108 to control the provision of fuel vapor to the engine.

At a given time, the purge valve 106 and the vent valve 108 may each be in one of two positions: an open position or a closed position. The control module 110 may enable the provision of ambient air (i.e., atmospheric air) to the canister 104 by actuating the vent valve 108 to the open position. While the vent valve 108 is in the open position, the control module 110 may actuate the purge valve 106 to the open position to purge fuel vapor from the canister 104 to the intake manifold. The control module 110 may control the rate at which fuel vapor is purged from the canister 104 (i.e., a purge rate). For example, the purge valve 106 may include a solenoid valve, and the control module 110 may control the purge rate by controlling a duty cycle of a signal applied to the purge valve 106.

The vacuum within the intake manifold draws fuel vapor from the canister 104 through the purge valve 106 to the intake manifold. The purge rate may be determined based on the duty cycle of the signal applied to the purge valve 106 and the amount of fuel vapor within the canister 104. Ambient air is drawn into the canister 104 through the open vent valve 108 as fuel vapor is drawn from the canister 104. The vent valve 108 may also be referred to as a diurnal control valve.

The control module 110 actuates the vent valve 108 to the open position and controls the duty cycle of the purge valve 106 during operation of the engine. When the engine is shutdown (e.g., the ignition key is off), the control module 110 actuates the purge valve 106 and the vent valve 108 to their respective closed positions. In this manner, the purge valve 106 and the vent valve 108 are generally maintained in their respective closed positions when the engine is not running.

Liquid fuel may be added to the fuel tank 102 via a fuel inlet 112. A fuel cap 114 closes the fuel inlet 112. The fuel cap 114 and the fuel inlet 112 may be accessed via a fueling compartment 116. A fuel door 118 closes to seal the fueling compartment 116.

A fuel level sensor 120 measures the amount of liquid fuel within the fuel tank 102 and generates a fuel level signal based on the amount of liquid fuel within the fuel tank 102. For example only, the amount of liquid fuel in the fuel tank 102 may be expressed in terms of a volume, a percentage of a maximum volume of the fuel tank 102, or another suitable measure of the amount of fuel in the fuel tank 102.

The ambient air provided to the canister 104 through the vent valve 108 may be drawn from the fueling compartment 116. A filter 130 receives the ambient air and filters various particulate from the ambient air. For example only, the filter 130 may filter particulate having a dimension of more than a predetermined dimension, such as greater than approximately 5 microns. Filtered air is provided to the vent valve 108.

The fuel system 100 also includes an EVAP leak check (ELC) system 131 that checks for leaks in the EVAP system 103. The ELC system includes a switching valve 132, a vacuum pump 134, a filtered pressure sensor 136, and a reference orifice 138. The control module 110 controls the switching valve 132 and the vacuum pump 134, and receives pressures detected by the filtered pressure sensor 136.

The switching valve 132 is actuated to adjust the flow of the filtered air to the vent valve 108. The switching valve 132 is actuated to a vent position to allow ambient air to circulate through the filter 130 and to the vent valve 108, thereby venting the suction side of the vacuum pump 134 to the atmosphere. The switching valve 132 is actuated to a pump position to prevent filtered air from flowing to the vent valve 108, thereby sealing the suction side of the vacuum pump 134 from the atmosphere.

The vacuum pump 134 may be used in conjunction with actuation of the purge valve 106, the vent valve 108, and the switching valve 132 to check for leaks in the EVAP system 103. The EVAP system 103, the switching valve 132, and the filtered pressure sensor 136 are on the suction side of the vacuum pump 134. The filter 130 is on the exhaust side of the vacuum pump 134.

When the purge valve 106 is closed and the vent valve 108 is open, the vacuum pump 134 creates a vacuum between the purge valve 106 and the vacuum pump 134. When the vent valve 108 is closed, the vacuum pump 134 creates a vacuum between the vent valve 108 and the vacuum pump 134. A relief valve 144 may be used to discharge the pressure or vacuum.

The filtered pressure sensor 136 measures the pressure of filtered air on the suction side of the vacuum pump 134 at a location between the vent valve 108 and the vacuum pump 134. The filtered pressure sensor 136 generates a filtered pressure signal based on the filtered pressure. The filtered pressure sensor 136 provides the filtered pressure signal to the control module 110.

The control module 110 may also receive signals from other sensors, such as an ambient pressure sensor 146, an engine speed sensor 148, and a tank vacuum sensor 150. The ambient pressure sensor 146 measures the pressure of the ambient air, and generates an ambient air pressure signal based on the ambient air pressure.

The engine speed sensor 148 measures the rotational speed of the engine and generates an engine speed signal based on the rotational speed. For example only, the engine speed sensor 148 may measure the rotational speed based on rotation of a crankshaft in the engine. The tank vacuum sensor 150 measures vacuum of the fuel tank 102 and generates a tank vacuum signal based on the tank vacuum. For example only, the tank vacuum sensor 150 may measure the tank vacuum within the canister 104. Alternatively, pressure may be measured in the fuel tank 102, and the tank vacuum may be determined based on a difference between the tank pressure and the ambient air pressure.

The control module 110 performs diagnostics on the fuel system 100. The control module 110 performs a diagnostic to detect leaks in the EVAP system 103. The control module 110 performs the leak diagnostic after the vehicle is off (e.g., keyed off) for a predetermined period. When the vehicle is initially shut off, the control module 110 enters a sleep mode in which the control module 110 has no external communication and operates on low power. When performing the leak diagnostic, the control module 110 switches to a wake mode in which the control module has external communication and operates on full power.

The control module 110 performs a diagnostic to determine when the vacuum pump 134 is stuck on. The control module 110 performs the pump diagnostic using the switching valve 132 to identify a stuck-on fault regardless of whether the vacuum pump 134 becomes stuck on before or when the control module 110 wakes up. The control module 110 performs the pump diagnostic before performing the leak diagnostic to ensure that the results of the leak diagnostic are accurate.

Figure 2:
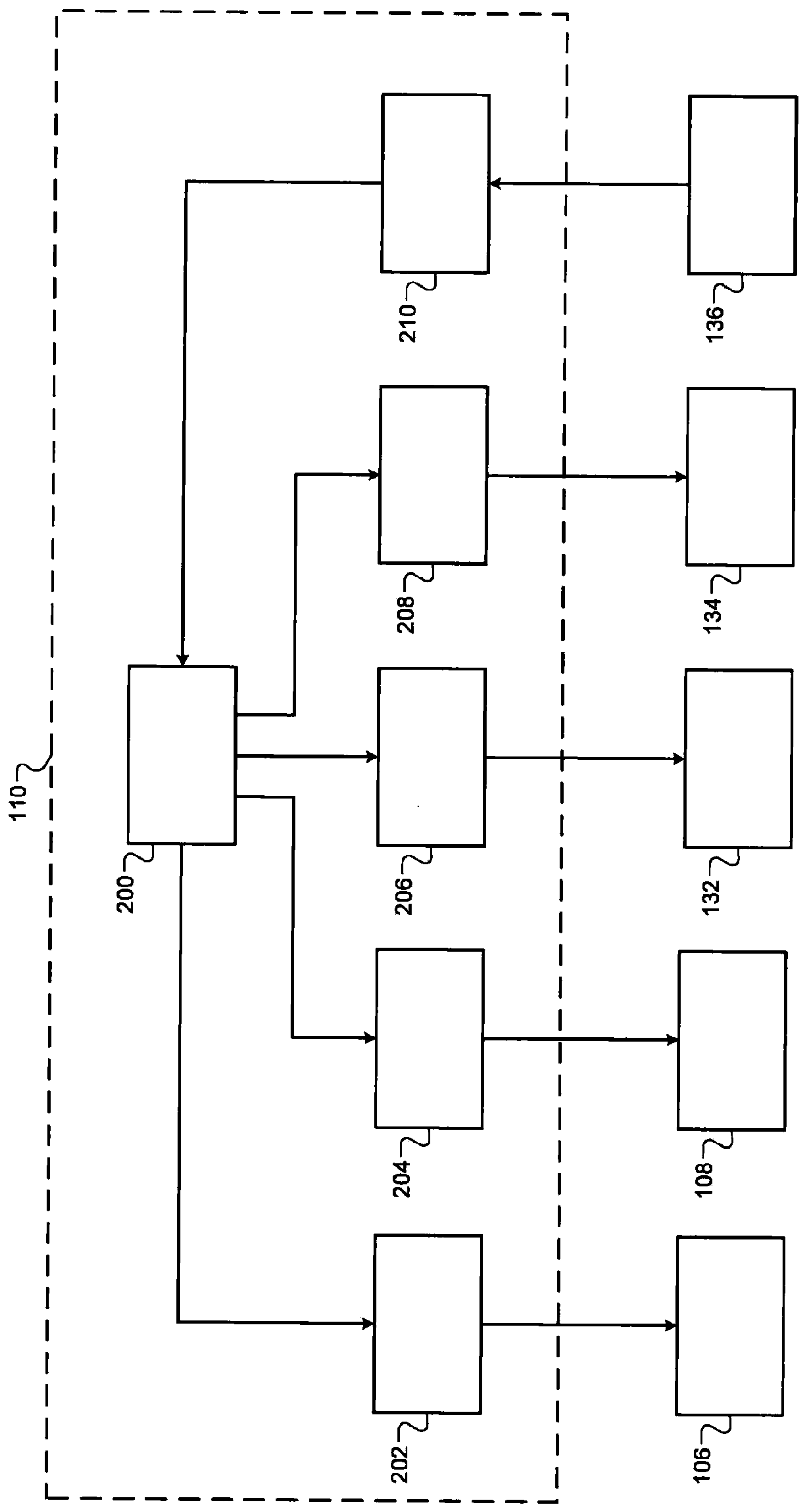
FIG. 2 is a functional block diagram of an evaporative leak check (ELC) control system according to the principles of the present disclosure.

Referring now to FIG. 2, the control module 110 includes a fuel system diagnostic module 200, modules that communicate with components of the EVAP system 103, and modules that communicate with components of the ELC system 131. The modules that communicate with components of the EVAP system 103 include a purge valve control module 202 and a vent valve control module 204. The modules that communicate with components of the ELC system 131 include a switching valve control module 206, a pump control module 208, and a pressure determination module 210.

The fuel system diagnostic module 200 communicates with other modules in the control module 110 to perform diagnostics on the fuel system 100, such as the pump diagnostic and the leak diagnostic. The fuel system diagnostic module 200 initiates the pump diagnostic when the vehicle is off (e.g., keyed off) for a predetermined period. The fuel system diagnostic module 200 initiates the leak diagnostic when the pump diagnostic is complete and the vacuum pump 134 is not stuck on.

The purge valve control module 202 actuates the purge valve 106 between the open position and the closed position based on a signal received from the fuel system diagnostic module 200. The vent valve control module 204 actuates the vent valve 108 between the open position and the closed position based on a signal received from the fuel system diagnostic module 200.

The switching valve control module 206 actuates the switching valve 132 between the vent position and the pump position based on a signal received from the fuel system diagnostic module 200. The pump control module 208 activates and deactivates the vacuum pump (i.e., switches the vacuum pump 134 on and off) based on a signal received from the fuel system diagnostic module 200.

The pressure determination module 210 receives the filtered pressure signal from the filtered pressure sensor 136. The pressure determination module 210 determines the filtered pressure based on the filtered pressure signal. The pressure determination module 210 outputs the filtered pressure to the fuel system diagnostic module 200.

Figure 3:
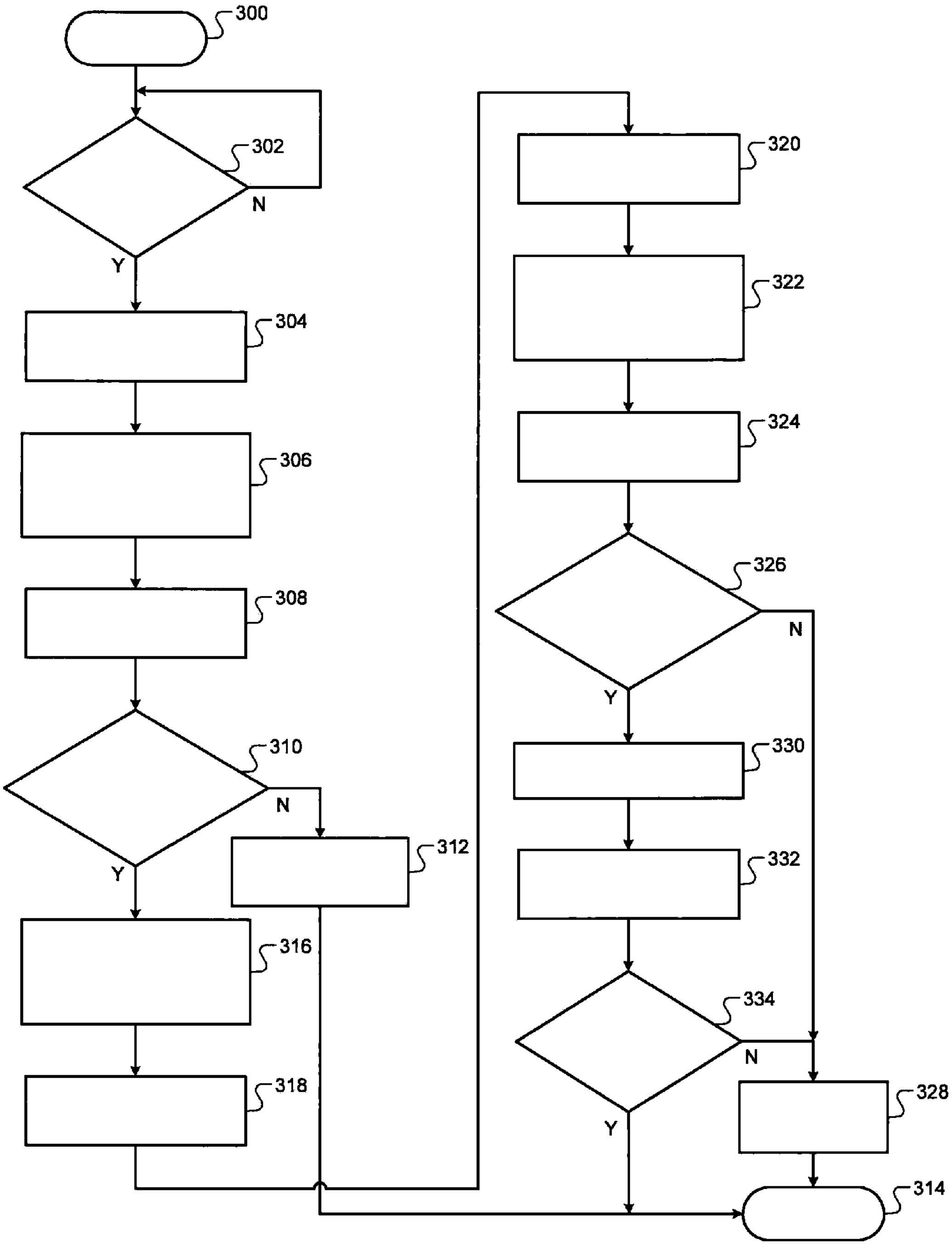
FIG. 3 is a flow diagram illustrating steps of an ELC control method according to the principles of the present disclosure.

The modules shown in FIG. 2 perform diagnostics on the fuel system 100 by executing one or more of the steps shown in the method illustrated in FIG. 3. In one example, the fuel system diagnostic module 200 may diagnose a fault in the vacuum pump 134 and/or a leak in the fuel system 100 based on pressures determined by the pressure determination module 210. In another example, the fuel system diagnostic module 200 may determine thresholds used in the fuel system diagnostics.

Referring now to FIG. 3, a method for performing diagnostics on the fuel system 100 is illustrated. The method performs fuel system diagnostics including the pump diagnostic and the leak diagnostic. The method begins at 300. At this point, the purge valve 106 is closed (i.e., in the closed position), the vent valve 108 is closed, the switching valve 132 is in the vent position, and the vacuum pump 134 is commanded off.

At 302, the method determines whether the vehicle is off (e.g., keyed off) for a predetermined period. If 302 is false, the method continues to determine whether the vehicle is off for the predetermined period. If 302 is true, the method continues at 304 and continues to perform the fuel system diagnostics.

The method may postpone the fuel system diagnostics based on operating conditions of the fuel system 100. For example, the method may postpone the fuel system diagnostics based on a fuel level (i.e., a level of fuel in the fuel tank 102) and/or the ambient air pressure measured by the ambient pressure sensor 146.

At 304, the method determines a first pressure in the fuel system 100 on the suction side of the vacuum pump 134 using the filtered pressure sensor 136. The method may determine the first pressure when the control module 110 initially wakes up. Since the switching valve 132 is in the vent position, the filtered pressure sensor 136 is in fluid communication with ambient air via the filter 130. Also, the vacuum pump 134 is commanded off and therefore may not be creating a vacuum in the fuel system 100. Thus, the first pressure may represent barometric pressure.

At 306, the method actuates the switching valve 132 from the vent position to the pump position. At 308, the method determines a second pressure in the fuel system 100 on the suction side of the vacuum pump 134 using the filtered pressure sensor 136. The method may determine the second pressure when the switching valve 132 is actuated to the pump position and/or when a predetermined period has elapsed after the first pressure is determined.

When the switching valve 132 is actuated to the pump position, the filtered pressure sensor 136 is not in fluid communication with ambient air via the filter 130. However, the vacuum pump 134 is still commanded off and therefore may not be creating a vacuum in the fuel system 100. Thus, the second pressure may also represent barometric pressure.

At 310, the method determines whether a first difference between a first pressure and a second pressure is less than or equal to a first threshold. If 310 is false, the method continues at 312, diagnoses a stuck-on fault in the vacuum pump 134, and ends at 314. If 310 is true, the method actuates the switching valve 132 to the vent position at 316, activates the vacuum pump 134 at 318, and continues to 320.

When the vacuum pump 134 is stuck on, the vacuum pump 134 creates a vacuum in the fuel system between the vent valve 108 and the vacuum pump 134. When the vacuum pump 134 becomes stuck on before the control module 110 wakes up, the vacuum is already created when the first pressure is determined. However, the vacuum increases as the switching valve 132 is actuated to the pump position. Thus, a stuck-on fault may be diagnosed even when the vacuum pump 134 becomes stuck on before the control module 110 wakes up.

The first threshold may be predetermined and/or may be determined based on a vacuum created by a flow capacity of the vacuum pump 134 when the valves 106, 108, 132 are positioned as described above. For example, the flow capacity of the vacuum pump 134 may yield a vacuum equal to 1 kilopascal (kPa) in this condition. In this case, the first threshold may be approximately equal to 1 kPa.

At 320, the method determines a third pressure in the fuel system 100 on the suction side of the vacuum pump 134 using the filtered pressure sensor 136. Since the vacuum pump 134 is on and the switching valve 132 is in the vent position, the vacuum pump 134 circulates air through the filter 130 and through the reference orifice 138. This creates a vacuum on the suction side of the vacuum pump 134.

The vacuum created between the reference orifice 138 and the vacuum pump 134 is equivalent to the vacuum created when the switching valve 132 is in the pump position and the fuel system 100 has a leak equal in size to the reference orifice 138. Thus, the reference orifice 138 may be sized to represent an allowable leak in the fuel system 100. For example, the reference orifice may have a diameter approximately equal to 450 micrometers.

The method continues at 322, actuates the switching valve 132 from the vent position to the pump position, and continues at 324. The vacuum pump 134 creates a stronger vacuum when the switching valve 132 is in the pump position than when the switching valve 132 is in the vent position. The strength of the vacuum may be decreased if a leak exists in the sealed portion of the fuel system 100 on the suction side of the vacuum pump. Thus, to identify leaks, the strength of the vacuum may be measured by measuring pressure in the sealed portion of the fuel system 100 before and after the switching valve 132 is actuated while the vacuum pump 134 is on.

At 324, the method determines a fourth pressure in the fuel system 100 on the suction side of the vacuum pump 134 using the filtered pressure sensor 136. The method may determine the fourth pressure when the switching valve 132 is actuated to the pump position and/or when a predetermined period has elapsed after the third pressure is determined.

The method continues at 326 and determines whether a second difference between the third pressure and the fourth pressure is greater than or equal to a second threshold. If 326 is false, the method diagnoses a leak in the fuel system 100 at 328, and ends at 314. The leak may be in the vent valve 108 and/or in the lines in fluid communication with the vent valve 108. If 326 is true, the method continues at 330.

The second threshold may be predetermined and/or may be determined based on the barometric pressure and the flow capacity of the vacuum pump 134. For example only, the second threshold may range from 1.5 kPa to 4 kPa.

The barometric pressure varies with altitude, and the flow capacity of the vacuum pump 134 varies based on pump type and pump life. The first pressure and the second pressure represent the barometric pressure when the vacuum pump 134 is not stuck on. The flow capacity of the vacuum pump 134 may be determined based on the third pressure, which is measured when the vacuum pump 134 is circulating filtered air through the reference orifice 138.

At 330, the method opens the vent valve 108 and continues at 332. At 332, the method determines a fifth pressure when the vent valve 108 is open, the purge valve 106 is closed, the switching valve 132 is in the pump position, and the vacuum pump 134 is on. The vacuum pump 134 may create a stronger vacuum in this condition relative to when the vent valve 108 is closed, the switching valve 132 is in the vent position, and the vacuum pump 134 is on. However, a leak in the purge valve 106, in the canister 104, in the fuel tank 102, or in the lines in fluid communication with the purge valve 106, the canister 104, or the fuel tank 102 may weaken this vacuum.

Thus, the method continues at 334 and determines whether a difference between the third pressure and the fifth pressure is greater than or equal to a third threshold. If 334 is false, the method diagnoses a leak in the fuel system 100 at 328, and ends at 314. The leak may be in the purge valve 106, in the canister 104, in the fuel tank 102, and/or in the lines in fluid communication with the vent valve 106, the canister 104, or the fuel tank 102. If 334 is true, the method ends at 314.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system, comprising:

a switching valve control module that actuates a switching valve in a fuel system of a vehicle between a first position and a second position, the first position venting a suction side of a vacuum pump in the fuel system to an atmosphere, the second position sealing the suction side of the vacuum pump from the atmosphere;

a pressure determination module that:

determines a first pressure on the suction side of the vacuum pump when the switching valve is in the first position; and determines a second pressure on the suction side of the vacuum pump when the switching valve is in the second position; and a fuel system diagnostic module that selectively determines that the vacuum pump is stuck on based on the first pressure and the second pressure.

2. The control system of claim 1, wherein the fuel system diagnostic module determines that the vacuum pump is stuck on when a first difference between the first pressure and the second pressure is greater than a first threshold.

3. The control system of claim 2, wherein the fuel system diagnostic module determines the first threshold based on a flow capacity of the vacuum pump.

4. The control system of claim 1, wherein the pressure determination module determines the first pressure when the vehicle is off for a predetermined period.

5. The control system of claim 1, further comprising a pump control module that controls the vacuum pump, wherein the pressure determination module determines the first pressure and the second pressure when the vacuum pump is commanded off.

6. The control system of claim 1, further comprising a vent valve control module that controls a vent valve in the fuel system, wherein the pressure determination module determines the first pressure and the second pressure when the vent valve is commanded closed.

7. The control system of claim 1, further comprising a purge valve control module that controls a purge valve in the fuel system, wherein the pressure determination module determines the first pressure and the second pressure when the purge valve is commanded closed.

8. The control system of claim 7, wherein:

the pressure determination module determines a third pressure when the switching valve is in the first position and the vacuum pump is commanded on;

the pressure determination module determines a fourth pressure when the switching valve is in the second position and the vacuum pump is commanded on; and the fuel system diagnostic module selectively diagnoses a leak in the fuel system when a second difference between the third pressure and the fourth pressure is less than a second threshold.

9. The control system of claim 8, wherein the fuel system diagnostic module determines the second threshold based on at least one of the first pressure, the second pressure, and the third pressure.

10. The control system of claim 8, wherein the fuel system diagnostic module refrains from diagnosing a leak in the fuel system when the fuel system diagnostic module diagnoses a fault in the vacuum pump.

11. A method, comprising:

actuating a switching valve in a fuel system of a vehicle between a first position and a second position, the first position venting a suction side of a vacuum pump in the fuel system to an atmosphere, the second position sealing the suction side of the vacuum pump from the atmosphere;

determining a first pressure on the suction side of the vacuum pump when the switching valve is in the first position;

determining a second pressure on the suction side of the vacuum pump when the switching valve is in the second position; and selectively determining that the vacuum pump is stuck on based on the first pressure and the second pressure.

12. A method, comprising:

actuating a switching valve in a fuel system of a vehicle between a first position and a second position, the first position venting a suction side of a vacuum pump in the fuel system to an atmosphere, the second position sealing the suction side of the vacuum pump from the atmosphere;

determining a first pressure on the suction side of the vacuum pump when the switching valve is in the first position;

determining a second pressure on the suction side of the vacuum pump when the switching valve is in the second position;

selectively diagnosing a fault in the vacuum pump based on the first pressure and the second pressure; and determining that the vacuum pump is stuck on when a first difference between the first pressure and the second pressure is greater than a first threshold.

13. The method of claim 12, further comprising determining the first threshold based on a flow capacity of the vacuum pump.

14. The method of claim 11, further comprising determining the first pressure when the vehicle is off for a predetermined period.

15. The method of claim 11, further comprising determining the first pressure and the second pressure when the vacuum pump is commanded off.

16. The method of claim 11, further comprising determining the first pressure and the second pressure when a vent valve is commanded closed.

17. The method of claim 11, further comprising determining the first pressure and the second pressure when a purge valve is commanded closed.

18. The method of claim 17, further comprising:

determining a third pressure when the switching valve is in the first position and the vacuum pump is commanded on;

determining a fourth pressure when the switching valve is in the second position and the vacuum pump is commanded on; and selectively diagnosing a leak in the fuel system when a second difference between the third pressure and the fourth pressure is less than a second threshold.

19. The method of claim 18, further comprising determining the second threshold based on at least one of the first pressure, the second pressure, and the third pressure.

20. The method of claim 18, further comprising refraining from diagnosing a leak in the fuel system when a fault in the vacuum pump is diagnosed.

* * * * *